(12) United States Patent
Miles et al.

(10) Patent No.: US 8,356,777 B2
(45) Date of Patent: Jan. 22, 2013

(54) ADJUSTABLE HANGER

(75) Inventors: Kevin James Miles, Central Point, OR (US); Kim Paul Ramsay, Medford, OR (US)

(73) Assignee: Hammer, LLC, Central Point, OR (US)

( * ) Notice: Subject to any disclaimer, the term of this patent is extended or adjusted under 35 U.S.C. 154(b) by 175 days.

(21) Appl. No.: 12/605,961

(22) Filed: Oct. 26, 2009

(65) Prior Publication Data

US 2010/0314502 A1 Dec. 16, 2010

Related U.S. Application Data

(60) Provisional application No. 61/185,864, filed on Jun. 10, 2009.

(51) Int. Cl.
*F16L 3/00* (2006.01)

(52) U.S. Cl. ............... 248/59; 248/292.12; 248/295.11; 403/107

(58) Field of Classification Search ........... 248/470, 248/489, 323, 327, 317, 63, 70, 59, 74.3, 248/292.12, 58, 60, 295.11, 297.31, 297.21; 403/107, 108, 109, 330
See application file for complete search history.

(56) References Cited

U.S. PATENT DOCUMENTS

| | | | | |
|---|---|---|---|---|
| 128,457 A * | 7/1872 | Bishop | | 248/48.1 |
| 545,774 A * | 9/1895 | Clark | | 248/59 |
| 1,561,850 A | 11/1925 | Guttman | | |
| 3,170,664 A * | 2/1965 | Carner | | 248/59 |
| 3,185,418 A | 5/1965 | Appleton | | |
| 3,273,837 A * | 9/1966 | Willert et al. | | 248/59 |
| 3,493,206 A * | 2/1970 | Albro | | 248/59 |
| 3,559,910 A * | 2/1971 | Babb | | 248/59 |
| 3,565,375 A * | 2/1971 | Babb | | 248/59 |
| 3,942,750 A * | 3/1976 | Noorily | | 248/74.3 |
| 4,557,455 A * | 12/1985 | Benjamin | | 248/496 |
| 4,768,741 A * | 9/1988 | Logsdon | | 248/62 |
| 5,203,529 A * | 4/1993 | Penniman | | 248/222.11 |
| 5,221,064 A * | 6/1993 | Hodges | | 248/59 |
| 5,295,647 A * | 3/1994 | Weidler | | 248/62 |
| 5,598,994 A | 2/1997 | Olewinski et al. | | |
| 5,702,077 A * | 12/1997 | Heath | | 248/59 |
| 5,746,401 A * | 5/1998 | Condon | | 248/62 |
| 5,791,607 A * | 8/1998 | Thibault et al. | | 248/58 |
| 5,890,683 A * | 4/1999 | DePietro | | 248/58 |
| 6,241,210 B1 * | 6/2001 | Brindisi | | 248/476 |
| 6,382,570 B1 * | 5/2002 | Simpson et al. | | 248/74.3 |
| 6,957,797 B1 * | 10/2005 | Strobel | | 248/477 |
| 7,234,671 B2 * | 6/2007 | Avinger | | 248/215 |
| 7,284,728 B2 | 10/2007 | Connolly | | |
| 7,377,735 B2 * | 5/2008 | Cosenza et al. | | 411/517 |
| 2005/0258315 A1 * | 11/2005 | Bigham | | 248/74.3 |
| 2007/0075211 A1 * | 4/2007 | Potter | | 248/476 |
| 2010/0096532 A1 * | 4/2010 | Greve | | 248/477 |

* cited by examiner

*Primary Examiner* — Kimberly Wood

(74) *Attorney, Agent, or Firm* — Marger Johnson & McCollom, PC

(57) ABSTRACT

An adjustable hanger has a receiver having a hole arranged to allow mounting of the receiver on a fixed element, and a body opening in the receiver arranged to accept a connector. An adjustable hanger has a mounting having a hole arranged to allow the mounting to be mounted to a fixed element, and a shaft opening, a receiver having a shaft opening, a shaft having a portion insertable into the shaft opening on the mounting such that shaft can move relative to the mounting, and a portion insertable into the shaft opening on the receiver, and a connector arranged to be insertable into a connector opening on the receiver.

4 Claims, 12 Drawing Sheets

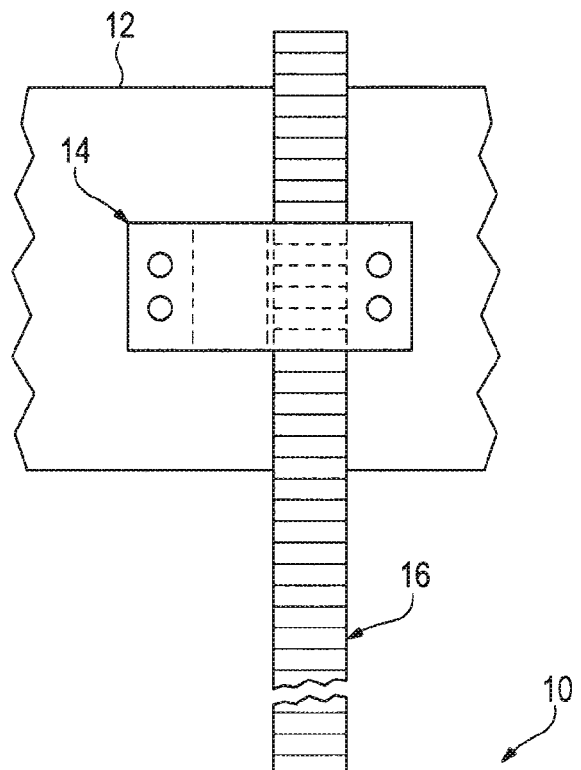
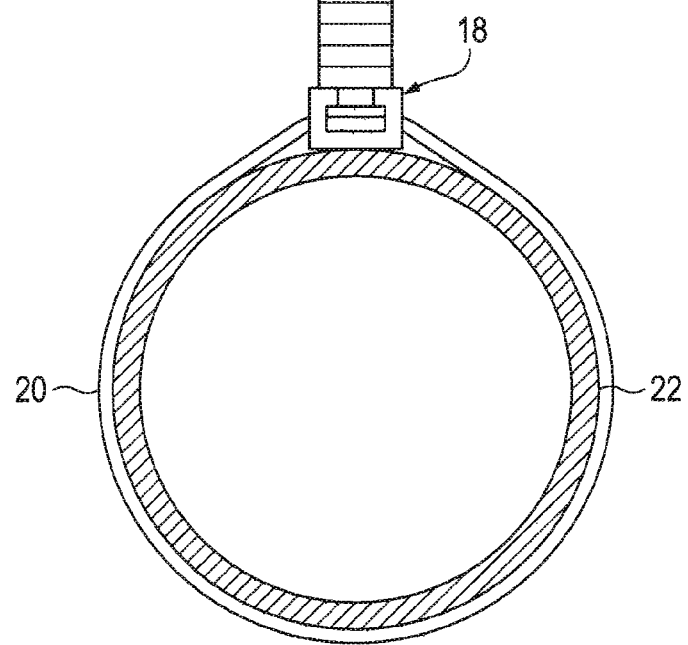
Figure 1

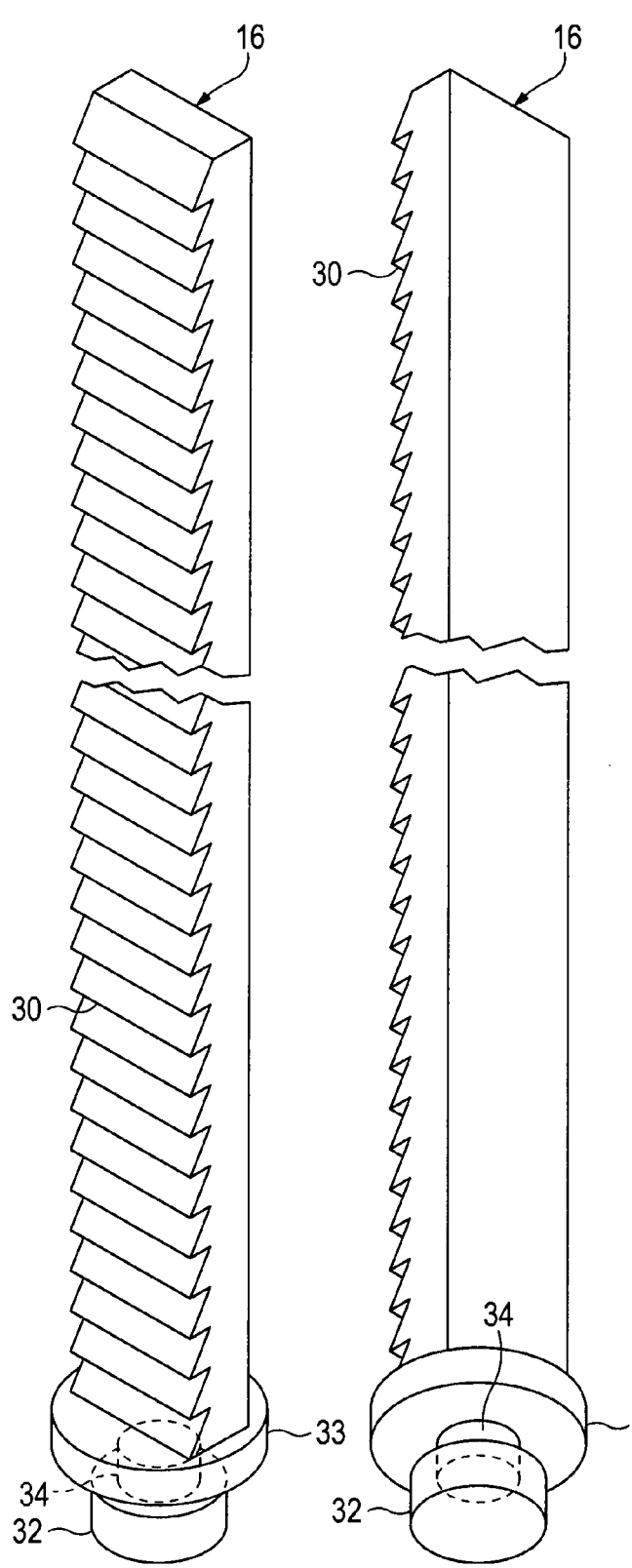
Figure 4 Figure 5
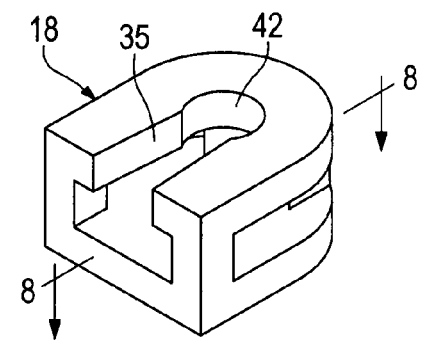
Figure 6
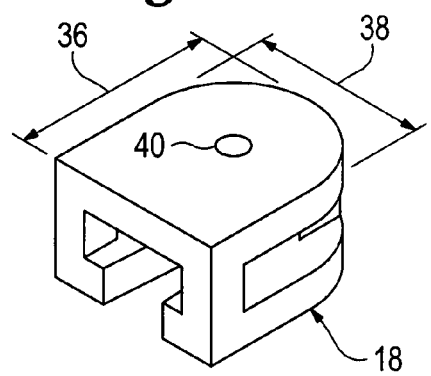
Figure 7
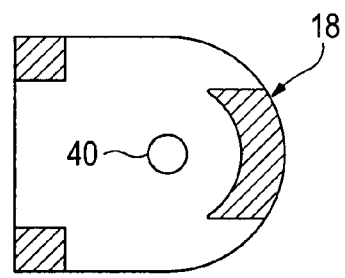
Figure 8
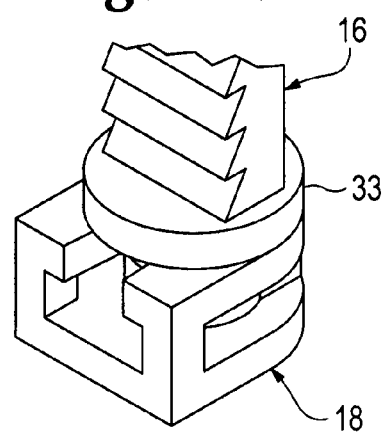
Figure 9

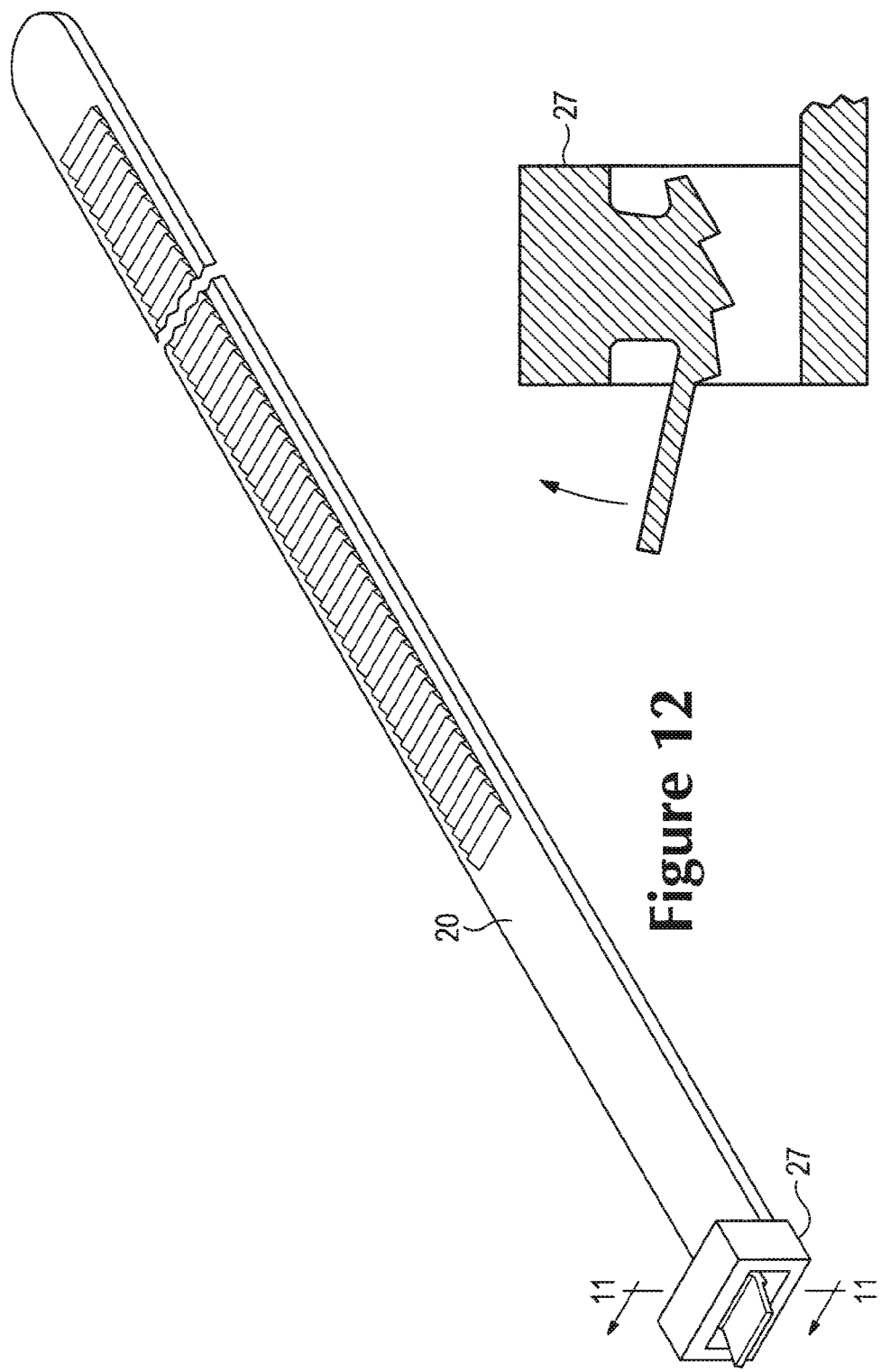

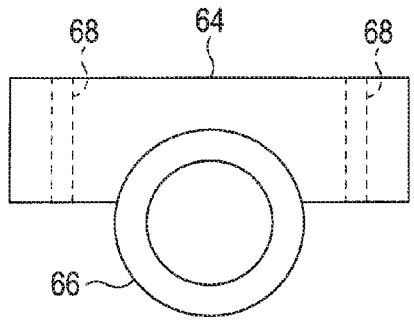
Figure 20
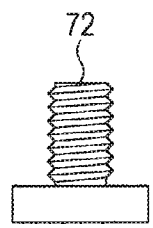
Figure 22
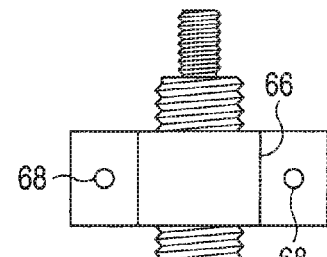
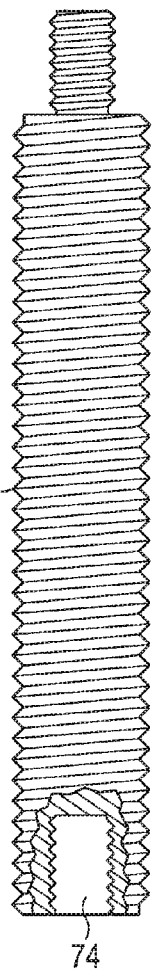
Figure 21
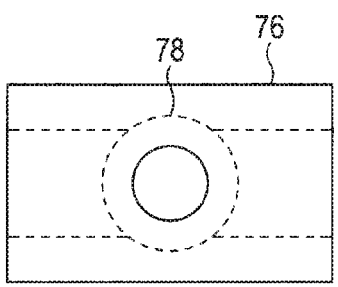
Figure 23
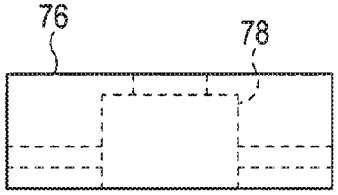
Figure 24
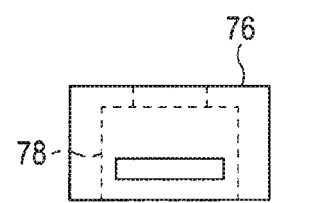
Figure 25
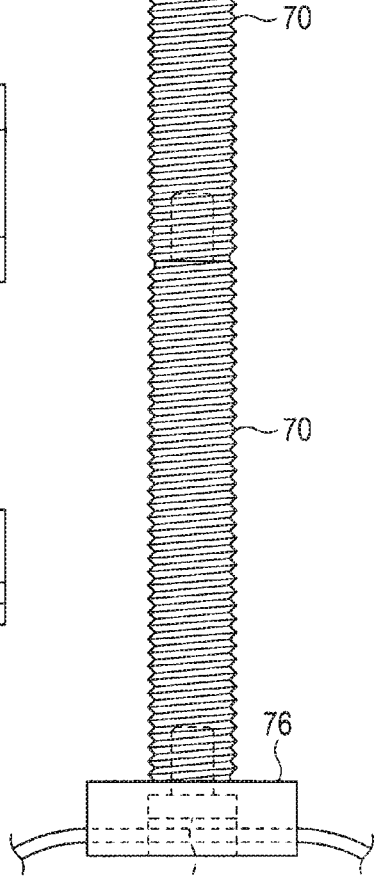
Figure 26

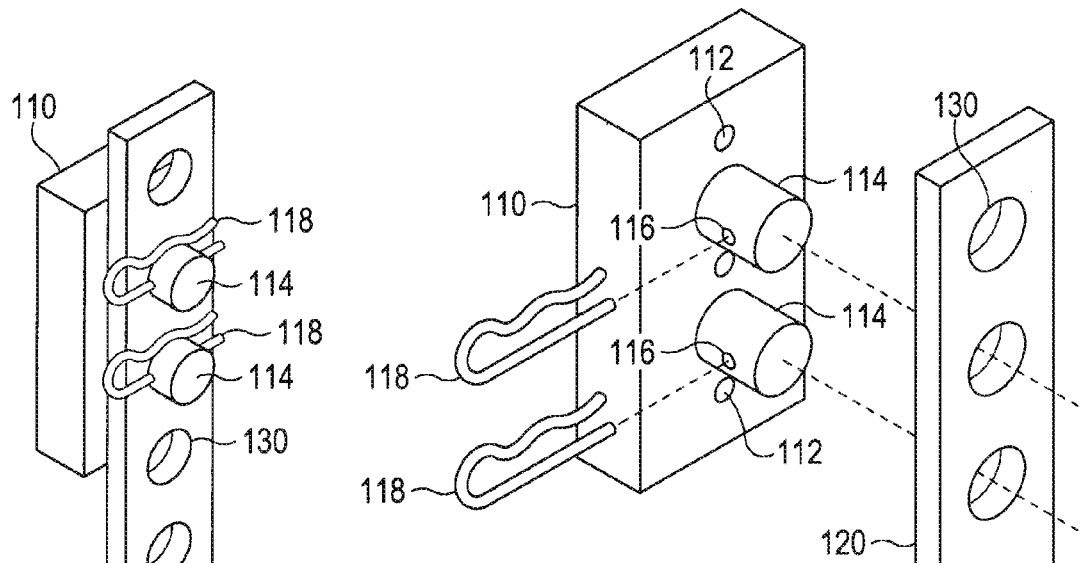
Figure 34
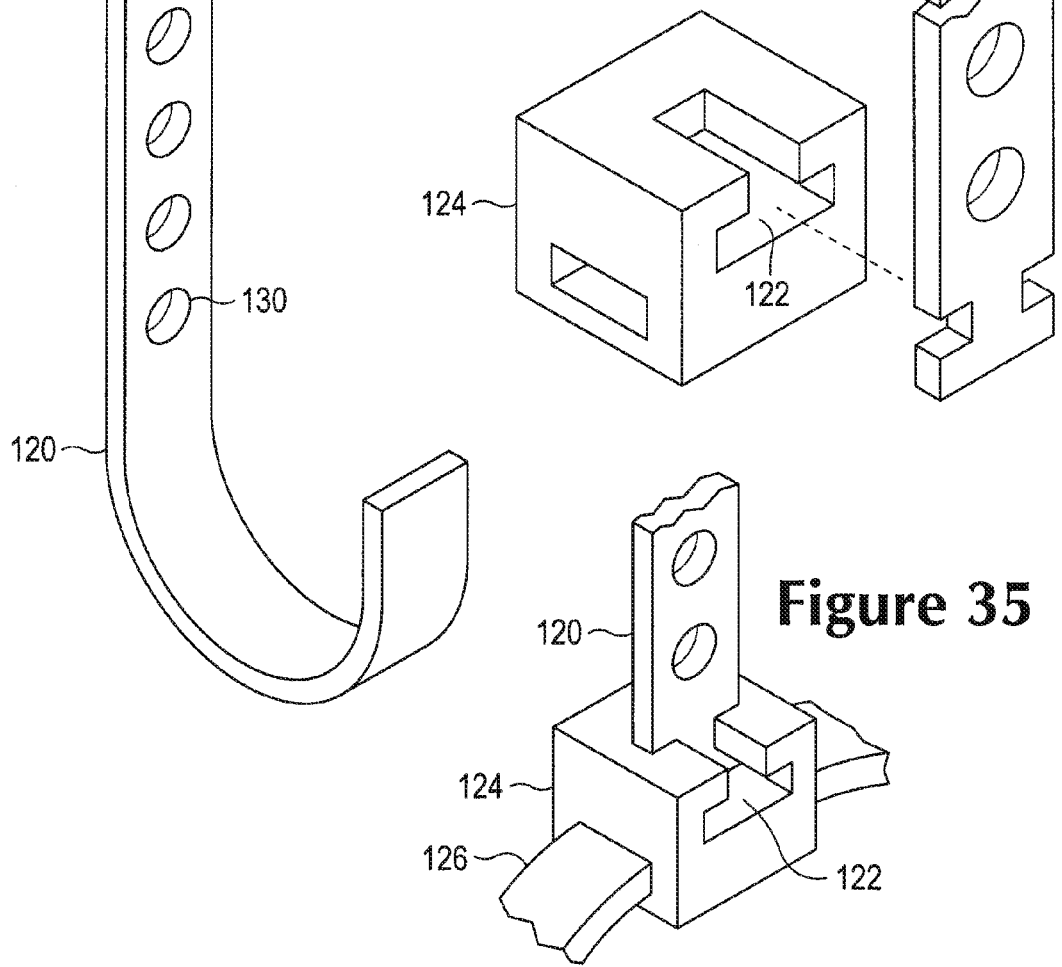
Figure 33
Figure 35

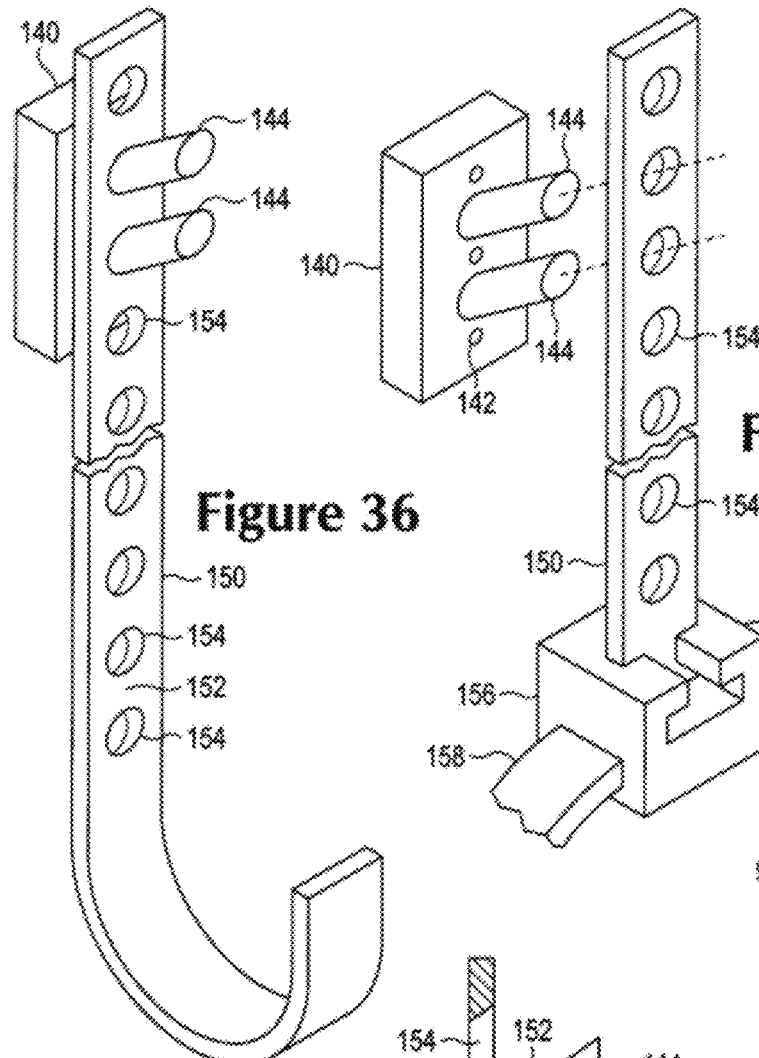
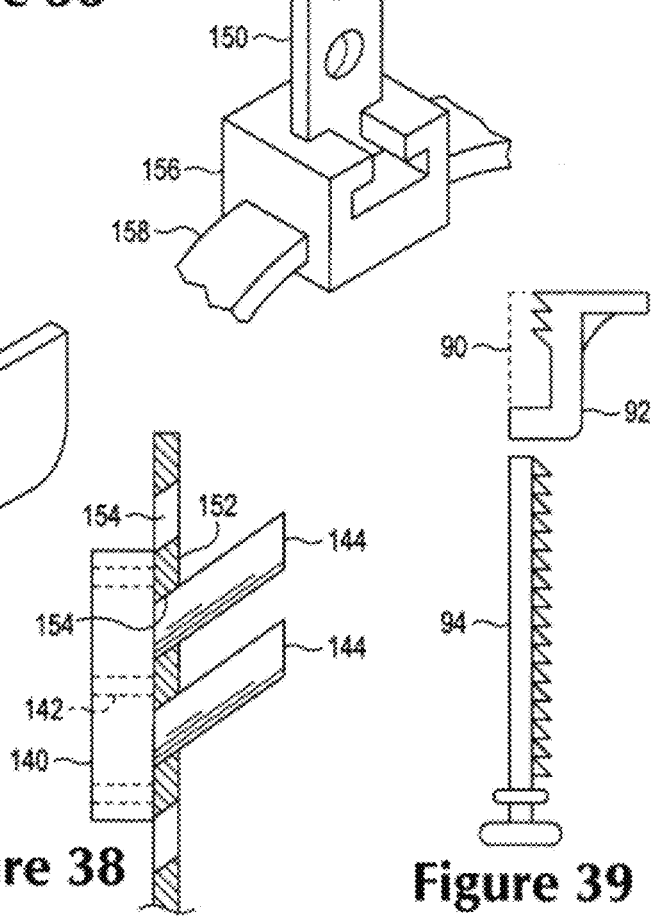

ADJUSTABLE HANGER

CROSS-REFERENCE TO RELATED APPLICATIONS

This application claims the benefit from U.S. provisional patent application Ser. No. 61/185,864 filed Jun. 10, 2009, titled ADJUSTABLE HANGER, which we incorporate in its entirety.

BACKGROUND

Hangers are used to hang items, such as pipes, from joists in structures, such as houses and buildings. The term 'pipe' here may include any type of conduit, such as PVC, metal, etc., that either provides a flow path for liquids, air, wires, etc. Generally, the pipe hangers are not adjustable. Once the hanger is attached to a building joist, the pipe is then attached to the hanger and there is no flexibility or adjustment possible.

This may be especially problematic when there is a long 'run' of pipe, or the positioning of the joist makes for an awkward fit for the pipe. Over time, the hanger may experience some sagging or extension and that may lead to a need for adjustment later. Current pipe hangers do not allow for this type of adjustment.

BRIEF DESCRIPTION OF THE DRAWINGS

FIG. 1 shows an embodiment of an adjustable hanger attached to a joist and supporting a pipe.

FIGS. 4-5 show alternative view of an embodiment of a shaft.

FIGS. 6-9 show alternative views of an embodiment of a receiver.

FIG. 12 shows an embodiment of a connector.

FIG. 13 shows an embodiment of a connection portion of a connector.

FIGS. 20-26 show another alternative embodiment of a hanger.

FIGS. 28-30 and 39 show a ratchet locking embodiment.

FIGS. 33-35 show another alternative embodiment of a hanger.

FIGS. 36-38 show another alternative embodiment of a hanger.

DETAILED DESCRIPTION OF THE EMBODIMENTS

Figure 2:
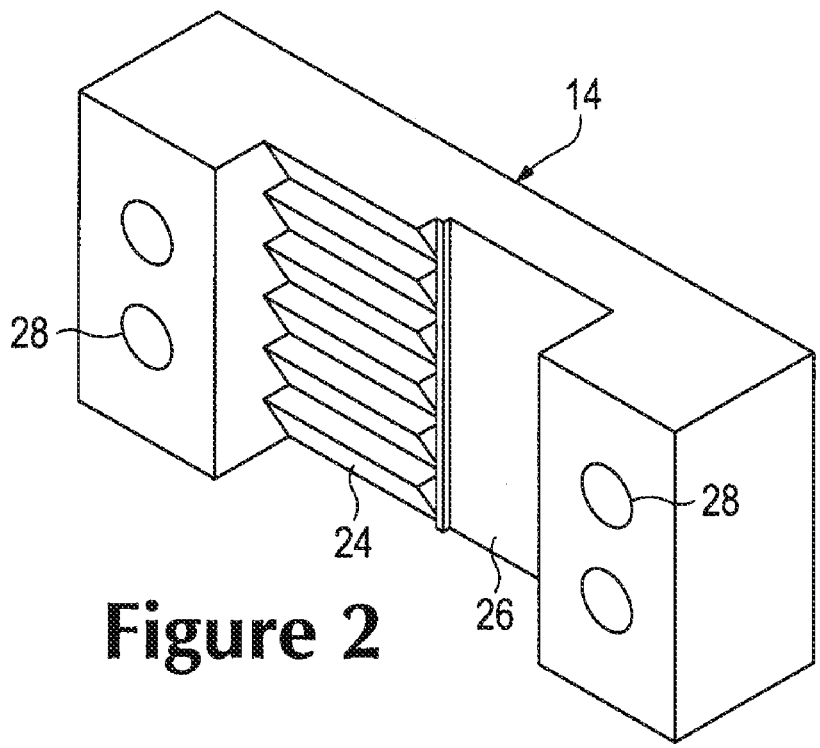
FIGS. 2-3 show alternative views of an embodiment of a mounting.

FIG. 1 shows an embodiment of an adjustable hanger. The prior art was discussed with regard to 'pipe' hangers, but the hangers discussed here may hang many different items, including but not limited to: water lines; recirculation lines; HVAC (heating ventilation and air conditioning); cooling lines; air lines, including flexible or rigid; electrical conduit; wire/cable/audio or video cables; fountain lines, such as soda and/or beer; vent lines on plumbing; storm drains, either interior or exterior lines; waste lines; fire suppression lines; air ducting; gas lines, either flexible or rigid; fiber optic lines; solar pipe and tubing; $CO_2$ lines; hot and cold water lines; and mechanical drain lines. In addition, the hangers may be used to hang other types of items. These items include signs, banners, etc.

These hangers are usable with many materials, including but not limited to: PVC pipe, copper pipe, flexible gas lines, black pipe, ridged conduit, CPVC, pex pipe, galvanized pipe, electrical conduit, fire suppression pipe, and all types of water lines.

These hangers may be used in residential, commercial or industrial structures in many areas, including but not limited to: attics, crawl spaces, walls, overhead exposed areas, under floors, basements, overhead and enclosed, interior or exterior to the structure. These hangers may attach to floor joists, wall framing, girts, steel studs, rafters, purlins, BCI, ceiling joists or any fixed element.

The hanger 10 is shown attached to a joist 12, seen through the hole in the mounting. In this embodiment, the hanger has 4 different pieces. These pieces are shown here as separate pieces, but it is possible that some of these pieces may be combined together into integrated pieces. For example, the mounting and the shaft may be pre-assembled or at least packaged together. The receiver may also be pre-assembled or packaged with the connector, which will be discussed in more detail further. No limitations to any separation or integration of the pieces are intended or should be implied.

As shown here, the 4 pieces consist of a mount 14, a shaft 16, a receiver 18 and a zip tie or other connector 20. The connector may be one of any type of flexible, connector that can be attached to the receiver and then fastened around the pipe 22. Generally, these pieces will be made of sturdy plastic, preferably reclaimed plastic, and will have a bearing weight appropriate for the pipe supported by the hanger. Each of these components of the hanger will be discussed separately.

Figure 3:
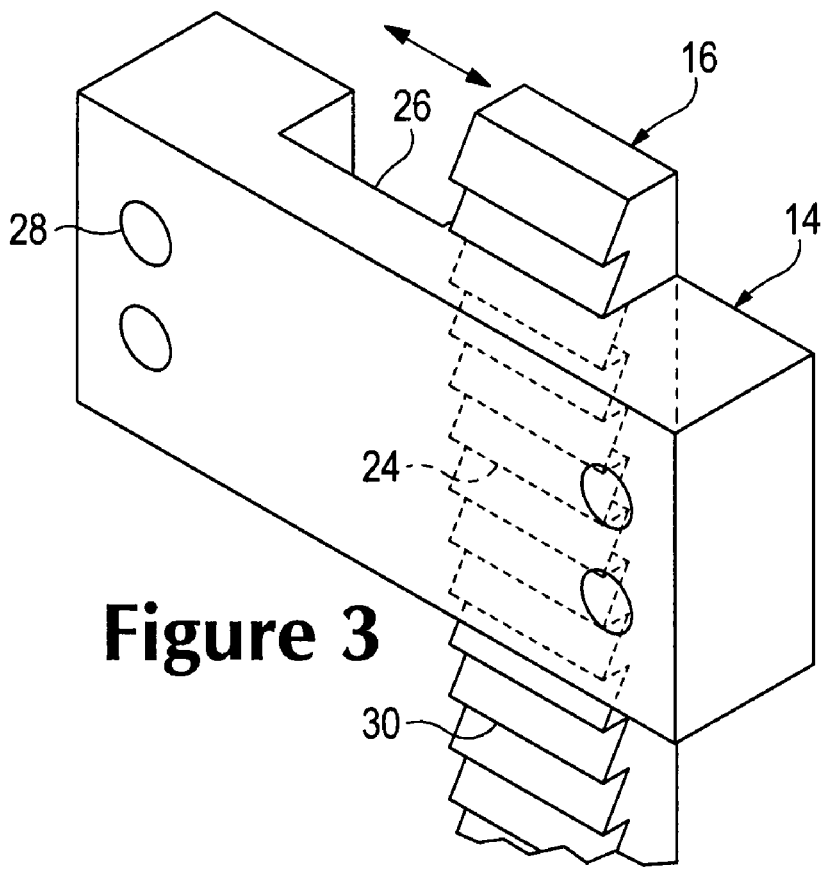

FIGS. 2-3 show alternative views of the mounting 14. FIG. 2 shows the 'working' side of the mounting 14. The mounting has a smooth side 26 and a toothed side 24. Holes 28 allow the mounting to be attached to a joist or beam from which the pipe will hang. In operation, the shaft 16 from FIG. 1 is slid into the mounting along the smooth side until the desired distance/tension for the hanger is achieved. The shaft is then slid sideways into the toothed portion 24 and the hanger is then fixed. This configuration allows the hanger to be adjusted after hanging the pipe, yet support the pipe securely.

If further adjustment is needed, the shaft is slid back to the smooth portion of the mounting and adjusted either up or down and then slid back into the toothed portion of the mounting. In order to ensure that the pipe remains hanging securely, it requires a not insignificant amount of effort to slide the shaft out, but it is possible. Other options include a twist and lock configuration, using downward pressure on the lock to prevent slippage. The shift may also be round or half-round or have a u-shape.

FIG. 3 shows a back view of the mounting 14. The mounting is smooth on the back or face side, allowing it to be firmly mounted against the joist or other structure from which the pipe will hang.

FIGS. 4-5 show alternative views of the shaft 16 from FIG. 1. As can be seen in FIG. 4, the shaft 16 has teeth 30 on one side that mate up with the toothed portion of the mounting. It is the mating of the teeth on the shaft 16 with the toothed portion 24 of the mount 14 that secures the hanger into place. The back side of the shaft is smooth as shown in FIG. 5. The shaft may be of many lengths, but in one embodiment is 26" long. The teeth may be in ⅛' increments and be ¼" deep.

Returning to FIG. 4, one can see the knob on the bottom of the shaft 16. The knob has a wider part 32 below a 'neck' or narrower part 34. This allows the shaft to mate to the receiver, shown as 18 in FIG. 1. In one embodiment, the neck part 34 has a width of ⅜" and is ¼" long from the shaft to the wider portion of the knob. In one embodiment, the knob portion 32 is round and ¼" long from the narrower portion to the end of the shaft. In one embodiment, the knob portion has a diameter of ¾". Having the round knob allows the receiver to rotate 360° providing even more flexibility in the mounting and adjustment of the pipe. The shaft may also have a round collar 33 on the shaft below the bottom tooth.

FIG. 6-9 show alternative views of the receiver 18 of FIG. 1. FIG. 6 shows a perspective top view of the receiver 18 and FIG. 7 shows a bottom perspective view. The receiver has a shaft opening 35 into which the shaft 16 is inserted. There may also be an optional hole 40 that allows the receiver to be oppositionally mounted from the mounting 14.

This optional hole also makes the receiver usable with just a connector, without the 'adjustable' portion of the hanger. Indeed, it is possible to package the receiver and the connector and use them alone. The receiver can be mounted on whatever surface desired and the tie can be used to connect whatever structure is to be mounted.

A connector opening 42 allows the insertion of a zip tie or other connector that will encircle the pipe and attach it to the hanger. While the receiver may be of any size, in one embodiment dimension 36 is 1" deep and 38 is 1¼" wide. FIG. 8 shows a cross-sectional view of the receiver taken along lines 8 of FIG. 6.

The receiver could be of many other shapes, including square, round, etc. It merely has to snap over the knob on the shaft, or the knob slid into the opening 35, to make it rotate. It may include a plug to put into the bottom of it, etc. Similarly, the opening could be of any shape that will allow the receiver to rotate, including hexagonal, octagonal, etc. FIG. 9 shows the receiver connected to the shaft 16.

Figure 10:
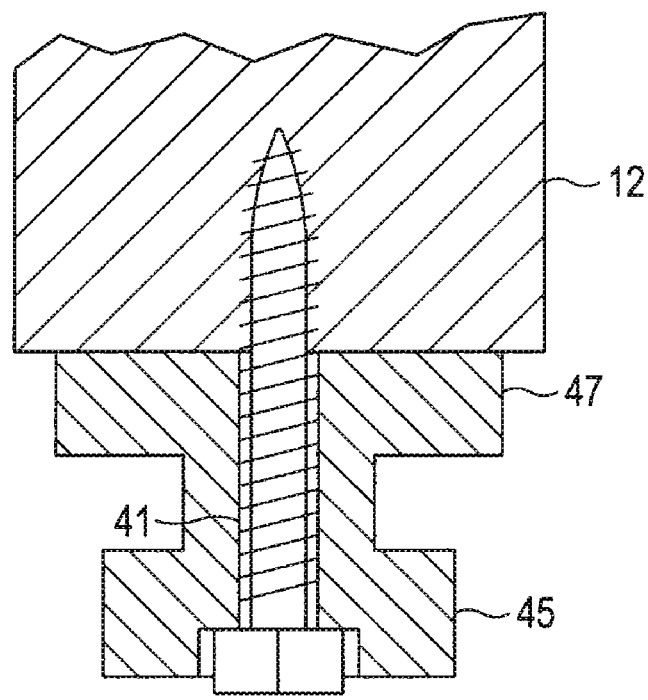
FIGS. 10-11 show alternative views of an embodiment of a button.
Figure 11:
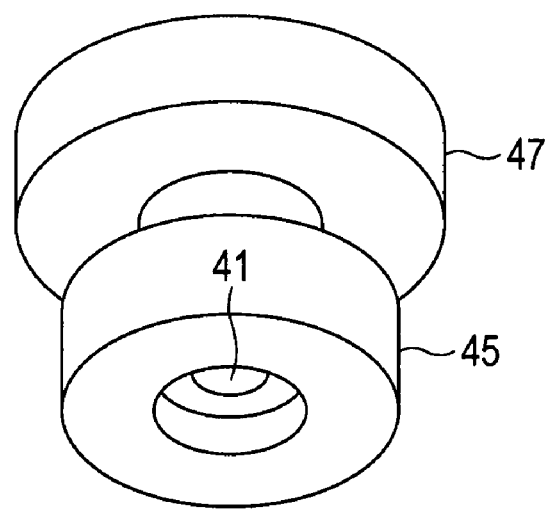

As mentioned above, the receiver may be mounted directly to the joist and the connector inserted into the receiver. As shown in FIG. 6, this may be accomplished by use of the nail hole 14. Alternatively, a 'button' may be mounted to the joist and the receiver would snap onto the button. FIG. 10 shows a top view of the button 41 mounted to the joist 12. In the top view of the button 41 alone in FIG. 11, the screw hole 43 is shown in the center of a front portion 45 that has a smaller circumference than the rear portion 47.

FIG. 12 shows an example of a connector 20 that will attach the pipe or item to be hung to the receiver 18 of the adjustable hanger of FIG. 1. As mentioned previously, a zip tie is a common type of connector, but any type of connector that can encircle the pipe, fit through the opening on the receiver and fasten the pipe into place may be used. In the embodiment of FIG. 12, the connector is a 24" releasable zip tie. Other examples of connectors include Velcro® strapping, metal zip ties, plastic permanent tie, releasable, non-releasable, string, rope, wire, flat strap metal, flat strap plastic, etc. Generally, the connectors will have an adjustment portion, such as the 'head' or locking portion of a zip tie, or the portion of a Velcro® strap that has the mating portion of the hook and loop closure, as examples, and a body portion which inserts or otherwise mates with the adjustment portion.

FIG. 13 shows a cross-sectional view of the connection portion 27 along the lines 11 of FIG. 12 into which the body of the connector inserts and locks. In this embodiment, the zip tie connector is re-usable; it can be released to allow the zip tie to be either loosened or tightened. Release is accomplished by lifting the lever in the direction of the arrow to release the zip tie.

Figure 14:
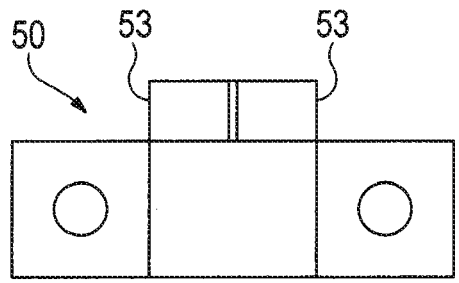
FIGS. 14-16 show alternative embodiments of hanger components.
Figure 15:
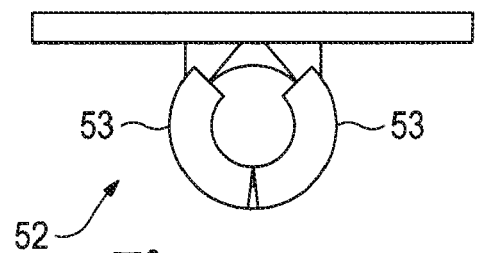
Figure 16:
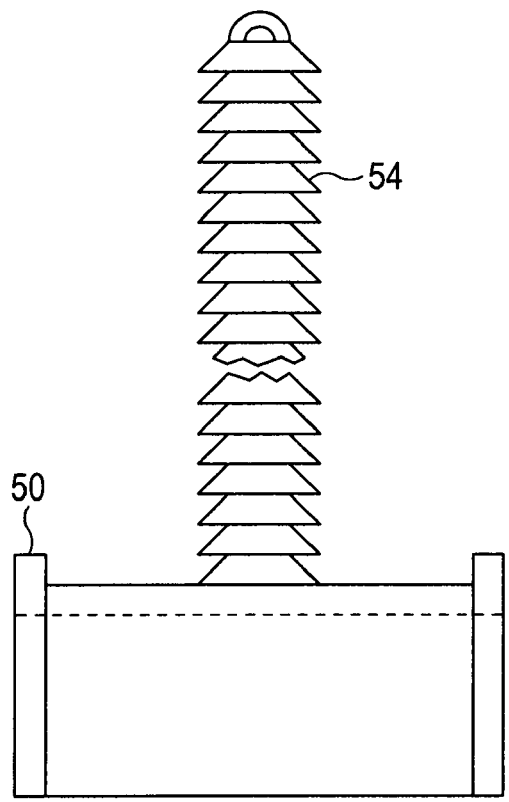

Having seen one embodiment of a hanger structure with variations, the discussion now turns to alternative embodiments of the each component or the overall hanger. FIGS. 14-16 show alternative components for an adjustable hanger.

FIG. 14 shows an alternative receiver 50 that attaches to a shaft. FIG. 15 shows an alternative mounting 52 that is round and has an openable jaw 53. FIG. 16 shows a round shaft 54 having teeth. The teeth would insert into the open jaw of the mounting 52 and then the jaw would be snapped shut once the adjustment was done. FIG. 16 also shows the receiver 50 attached to the bottom of the shaft 54.

Figure 17:
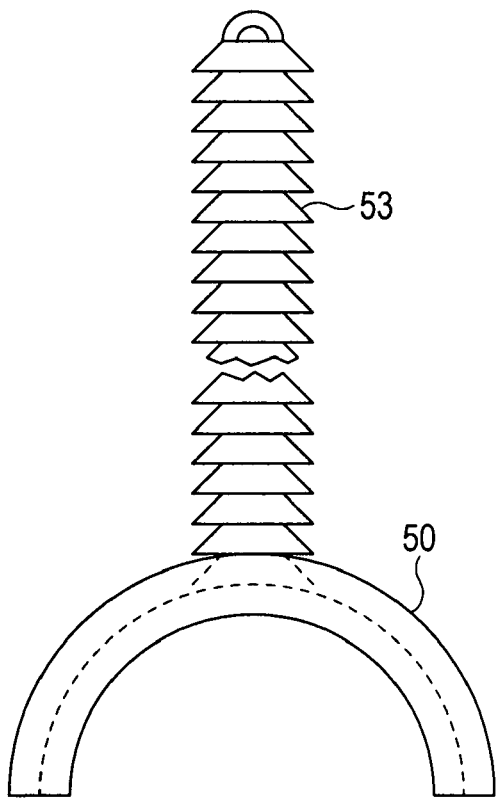
FIG. 17 show an alternative embodiment of a receiver

FIG. 17 shows another embodiment of a u-shaped receiver 50 from a top view.

Figure 18:
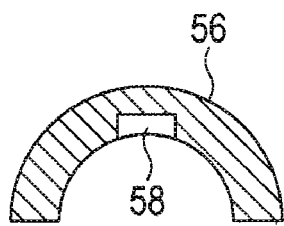
FIGS. 18-19 show an alternative embodiment of a hanger.
Figure 19:
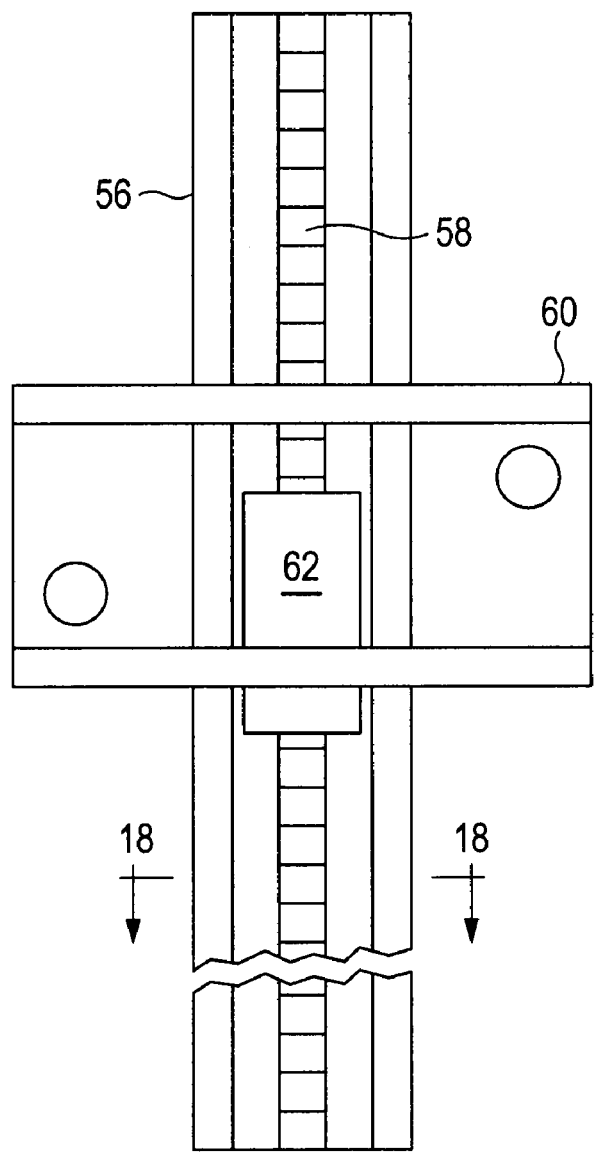

FIG. 18 shows a front view of a u-shaped shaft 56 having tapered notches such as 58 at defined intervals. The shaft would then be attached to the mounting 60 as shown in FIG. 19. The mounting has a pull out tab 62 that allows the shaft to slide when pulled out. When pushed in, the tab would lock the shaft into place.

FIGS. 20-26 show a round, threaded embodiment. The mount 64 is shown in top view in FIG. 20. The mount has nail holes 68 to allow it to be mounted to the joist and a round threaded opening 66 to accept a threaded shaft. FIG. 21 shows a threaded shaft. The drive pin 72 of FIG. 22 could be inserted into the recess 74 shown at the bottom of the shaft in FIG. 21.

Receiver 76, shown from the bottom view in FIGS. 23-25 has a hole 78 that accommodates the drive pin 72. This attaches the receiver to the drive pin that can then be inserted into the shaft 70, as shown in FIG. 26.

Figure 27:
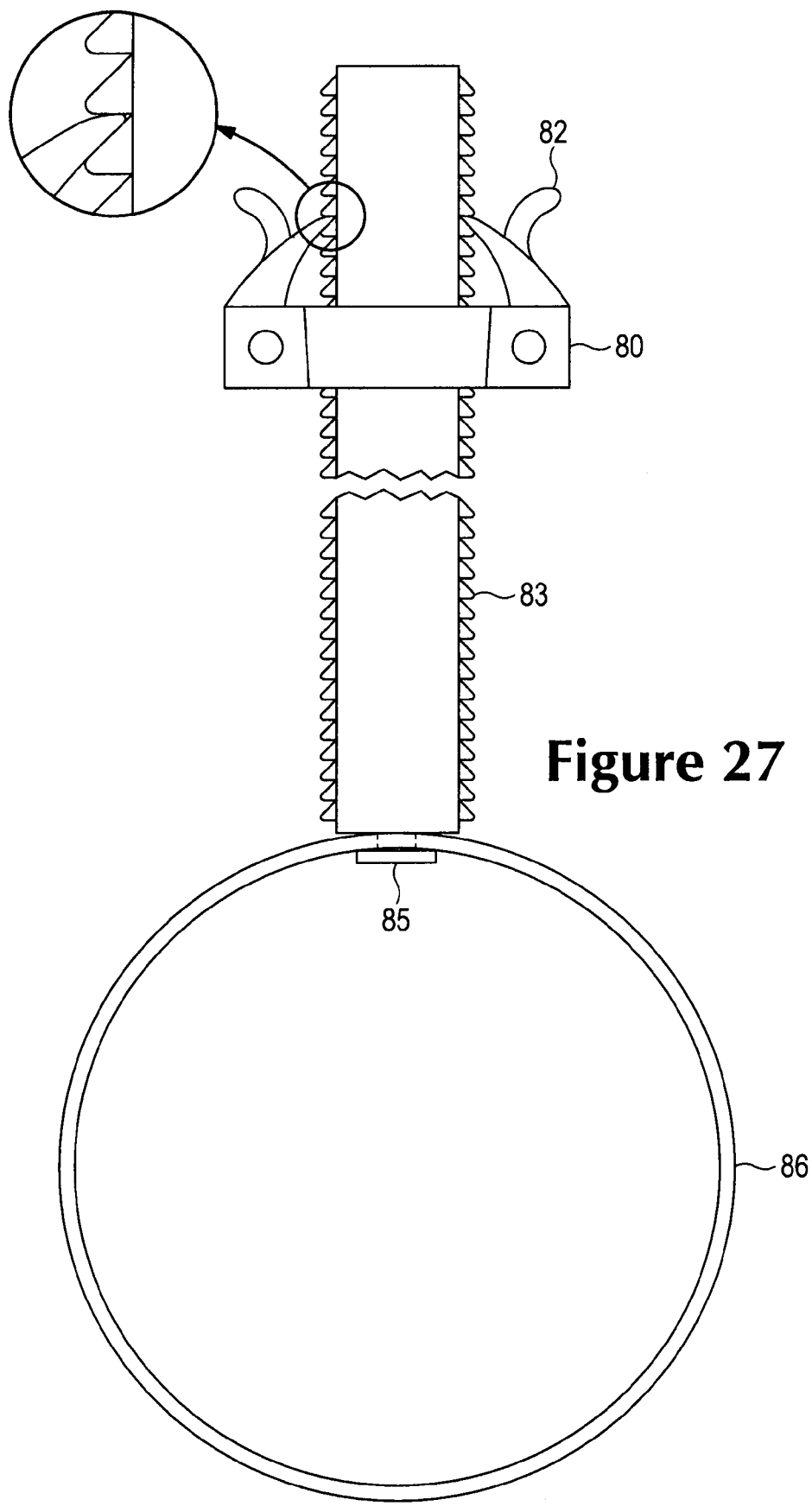
FIG. 27 shows an alternative embodiment of a mounting.

FIG. 27 shows an alternative mounting 80 with movable levers or catches 82 that allow the shaft 83 to move up and down as needed within the mounting. In this embodiment shows a complete hanger consists of the mounting 80 with the catches 82, the shaft 83 and the receiver 86. The shaft 83 has a point 85 that will turn a full 360 degrees. The receiver 86 in this instance may merely be a connector.

Figure 28:
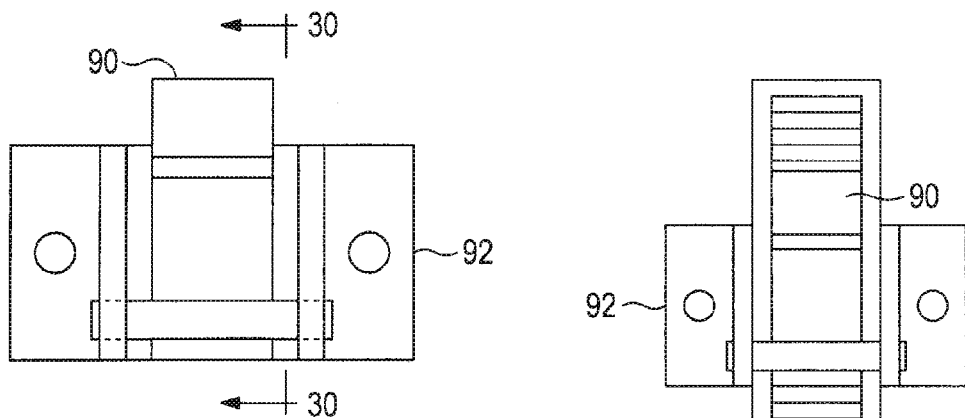
Figure 29:
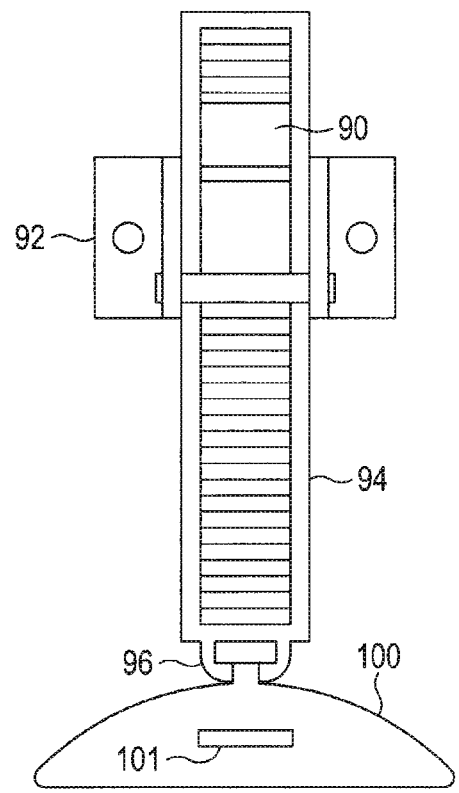
Figure 30:
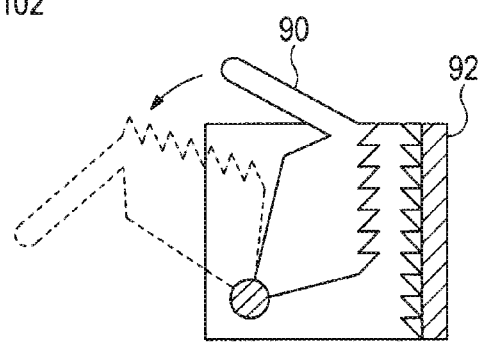

FIGS. 28-30 shows an alternative embodiment having a ratchet locking adjustment 90 on a toothed mounting 92. The shaft 94 has a keyhole 96 in the end of the shaft to accommodate the receiver 100 with the connector slot 101. FIG. 30 shows a side view of the ratchet locking mechanism 90 in the locked and open positions. FIG. 39 shows a side view of mounting 92 having an alternative ratchet locking mechanism 90 and the shaft 94.

Figures 31, 32:
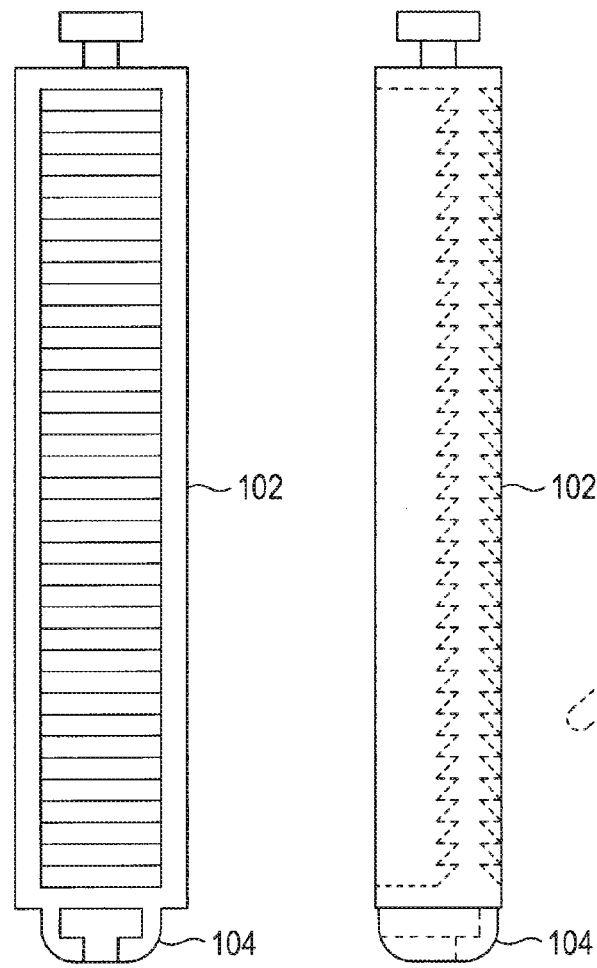
FIGS. 31-32 show another alternative embodiment of a hanger.

In another embodiment, shown in FIGS. 31-32 the shaft 102 would attach to the receiver and allow the hanger to extend. The bottom of the shaft 102 has a keyhole opening 104 to allow connection to the receiver 100 of FIG. 29.

FIG. 33 shows an alternative embodiment of an adjustable hanger mount 110. The mount would attach to the structure such as a beam or joist through nail holes 112. The mounting brackets 114 would then protrude from the side of the structure, and the mounting brackets have holes 116.

In the face view of FIG. 33, the shaft such as 120, would lie on top of the mounting brackets 114 and connect to the holes 116 through the holes 130 with a pin 118. The shaft 120 may have a J-type pipe hanger as shown in FIG. 33, or may be flat as shown in FIG. 34. The flat embodiment of FIG. 34 would then fit into the slot 122 on the receiver 124 and use the hanging strap 126 such as a zip tie as previously discussed as shown in FIG. 35.

FIGS. 36-38 show an alternative arrangement using a similar protruding mounting bracket or pin as that in FIGS. 33-35. In FIG. 39, the brackets of FIG. 33 have been replaced with wedge pins 144. The mounting 140 would attach to the structure via nail holes 142. The shaft 150 has angled holes such as 154, which have portions of the shaft material 152 between them. One would place the back of the J-type hanger against the wedge pins, which would enter the angled holes. The weight of the component being hung would then push down on the wedge pins and hold the hanger in place. This is shown in FIG. 38. Alternatively the angled holes could be used in the shaft 150 using the previously discussed receiver 156 and hanger 158.

As mentioned previously, the adjustable hanger components would be preferably manufactured with reclaimed plastic, as would the zip tie or connector. It is also desired that these components be manufactured nationally, in the USA.

Thus, although there has been described to this point a particular embodiment for an adjustable hanger, it is not intended that such specific references be considered as limitations upon the scope of this invention.

What is claimed is:

1. An adjustable hanger, comprising:
 a mounting having a hole arranged to allow the mounting to be mounted to a fixed element, a ratchet locking mechanism and a shaft opening, the mounting having a first side arranged to contact the fixed element;
 a receiver having a shaft opening and a connector opening;
 a flat shaft having a portion insertable into the shaft opening on the mounting such that shaft can move relative to the mounting, the shaft inserted adjacent the first side, and a portion insertable into the shaft opening on the receiver; and
 a connector arranged to be insertable into the connector opening on the receiver.

2. The hanger of claim 1, wherein the portion insertable into the shaft opening on the receiver arranged to allow the receiver to rotate three hundred and sixty degrees.

3. The hanger of claim 1, wherein the portion insertable into the shaft opening on the receiver comprises a knob and a neck, wherein the neck is narrower than a body of the shaft and the knob is wider than the neck.

4. The hanger of claim 1, wherein the mounting comprises a face having a toothed portion arranged to mate with teeth on the shaft and lock the shaft into place and having a smooth portion arranged to allow the shaft to slide.

* * * * *